United States Patent [19]

Koike

[11] Patent Number: 4,823,332

[45] Date of Patent: Apr. 18, 1989

[54] SIMPLIFIED SOUND REPRODUCING DEVICE CAPABLE OF REPRODUCING A PLURALITY OF RECORD DISCS

[75] Inventor: Eishi Koike, Sagamihara, Japan

[73] Assignee: Ozen Corporation, Tokyo, Japan

[21] Appl. No.: 23,817

[22] Filed: Mar. 9, 1987

[30] Foreign Application Priority Data

Apr. 30, 1986 [JP] Japan .................. 61-100542

[51] Int. Cl.⁴ .................. G11B 31/00; A63H 03/33
[52] U.S. Cl. .................. 369/63; 369/65; 369/194; 369/37
[58] Field of Search .................. 369/63, 67, 37, 65, 369/66, 191, 194

[56] References Cited

U.S. PATENT DOCUMENTS

| 4,286,789 | 9/1981 | Watanabe | 369/244 |
| 4,574,370 | 3/1986 | Koike | 369/63 X |
| 4,648,086 | 3/1987 | Koike | 369/65 |
| 4,670,866 | 6/1987 | Hasagawa et al. | 369/194 X |

Primary Examiner—David Werner
Assistant Examiner—Steven M. Du Bois
Attorney, Agent, or Firm—Arnold S. Weintraub; Gerald R. Black

[57] ABSTRACT

A plurality of record discs are carried on a single rotatable indexing table detachably mounted on the casing of the device, any one of which record discs can be brought into engagement with a turn table carrying a pickup. On the casing, there are provided a starting rod and a member for terminating reproduction upon arrival of the pickup of the tone arm at the end point of sound reproduction.

6 Claims, 4 Drawing Sheets

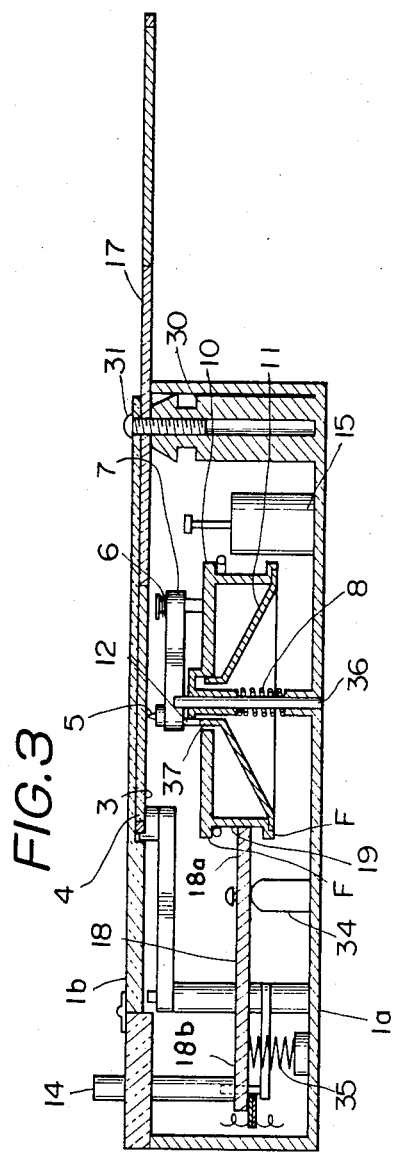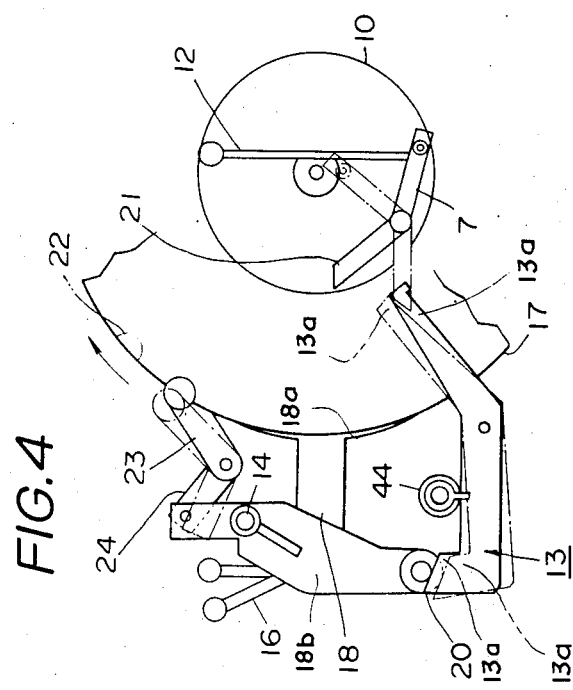

SIMPLIFIED SOUND REPRODUCING DEVICE CAPABLE OF REPRODUCING A PLURALITY OF RECORD DISCS

BACKGROUND OF THE INVENTION

1. Field of the Invention

This invention relates to a simplified sound reproducing device capable of carrying and reproducing a plurality of record discs, and more particularly, it relates to such a device comprising an indexing table rotatably supported on a casing so that a specific record disc can be placed into engagement with a turn table, thereby reproducing the desired record disc by indexing action initiated by the indexing table.

2. Description of the Prior Art

Heretofore, sound reproducing devices capable of selecting from and reproducing a plurality of record discs have been provided (for example, Japanese Patent Publications No. 57-31201 and 57-589).

Simplified sound reproducing devices of this type have a turn table provided with a tone arm having an upwardly facing sound reproducing stylus. The turn table which carries the tone arm is advanced or retracted so that the sound reproducing stylus can engage with or retract away from a record disc to be loaded or mounted on the tone arm.

However, in the sound reproducing devices of this type, each of the record discs is prepared and handled as an independent and separate item to be loaded on or mounted to a sound reproducing device, resulting in inconvenience of operation. Accordingly, the prior art devices do not satisfy the need to instantaneously play a desired item or sustain his interest by speedy operation.

In view of the above-mentioned problems encountered with the prior art devices, an object of the present invention is to provide a sound reproducing device comprising a single means constructed as an integral unit and capable of both holding a plurality of record discs and reproducing any desired disc out of the plurality of discs. Another object of the present invention is to provide a simplified sound reproducing device wherein the indexing operation of the device is fast and easy.

SUMMARY OF THE INVENTION

According to the sound reproducing device of the present invention, a plurality of record discs is rotatably supported on a casing of the sound reproducing device by a single indexing table carrying the plurality of discs thereon. The specific record disc selected for playing is fixedly disposed to engage a turn table which carries a pickup.

Moreover, in the present invention, means for terminating sound reproduction of the device is provided which comprises a bar disposed in the casing of the device and swingably supported at a halfway point of its length. One end of the bar extends into a pulley groove formed on the turn table and is urged by a spring so that the end of the bar can in turn urge a flange formed in the pulley groove in a retracting direction, thereby pushing the turn table against a stylus force spring. A starting member is attached to the other end of the bar, so that manipulation thereof releases the reproduction terminating means by movement thereof against the biasing force of the spring, thereby allowing the turn table to advance by a stylus force spring.

The device also comprises an engaging means for holding the bar against the biasing means at its forward position after it has advanced up to the turn table by manipulation of the starting means.

The device further comprises a cancelling means for releasing the starting means. The cancelling means is constructed in such a manner that one end of the tone arm opposite the reproducing stylus side projects outside beyond the outer periphery of the turn table. Thereby, the engaging means is placed out of engagement by the collision of the projecting end of the tone arm with the bar upon arrival of the reproduction stylus at the end point of sound reproduction.

The indexing table has a plurality of notches around its rotatable outer periphery for engagement by member normally biased toward the outer periphery.

A part of the engaging member extends below the bar, and the bar and the engaging member are provided with a male and a female coupling member, respectively. These male and female coupling members can mutually engage to fix the notch and the engaging member in a state of mutual engagement only when the bar is in its manipulated state by the starting member.

After the record disc has been disposed at a desired position by turning the indexing table, the manual depression of the starting means, the bar which has retained the turn table at its retracted position by its biasing means, releases the retention force applied to the turn table. The turn table is thereby allowed to advance, and, at the same time, an electric current is supplied to a motor which rotates the turn table. Then, the reproducing stylus engages the recorded face of the record disc causing sound reproduction of the selected recorded item. The depressed, operable status of the starting means will normally continue until termination of sound reproduction by virtue of the engaging means retaining it in the state of engagement.

Upon completion of the reproduction of the specific item, the cancelling means incorporated in the tone arm projects radially outwardly beyond the outer periphery of the turn table and impinges against the reproduction terminating means, thereby releasing the above-mentioned retaining action of the engaging means. By virtue of this releasing motion, the bar returns to its initial position by the biasing means, thereby urging the turn table to retract against the stylus force spring. Into one of the notches formed around the indexing table, a resiliently biasing engaging member enters for engagement.

The indexing table can be rotated against the biasing force imparted by the engaging member and fix the record disc carried thereon at a desired position of sound reproduction. However, once the sound reproduction has been started by the starting means, since the male/female coupling means formed between the bar and the engaging member has been brought into engagement and further movement of the coupling member prevented, by engaging member is fixed in engagement with the notch. If the reproduction stylus is engaged with the recorded face of the record disc, the indexing table is thereby locked at its indexed position.

BRIEF DESCRIPTION OF THE DRAWINGS

FIG. 3 is a cross-sectional side view taken along line 3—3 of FIG. 1;

FIG. 4 is a partial plan view showing a relation between the indexing table, turn table, cancelling means, reproduction terminating means, bar, engaging means, electrical contacts and so forth;

DETAILED DESCRIPTION OF THE PREFERRED EMBODIMENTS

Figure 1:
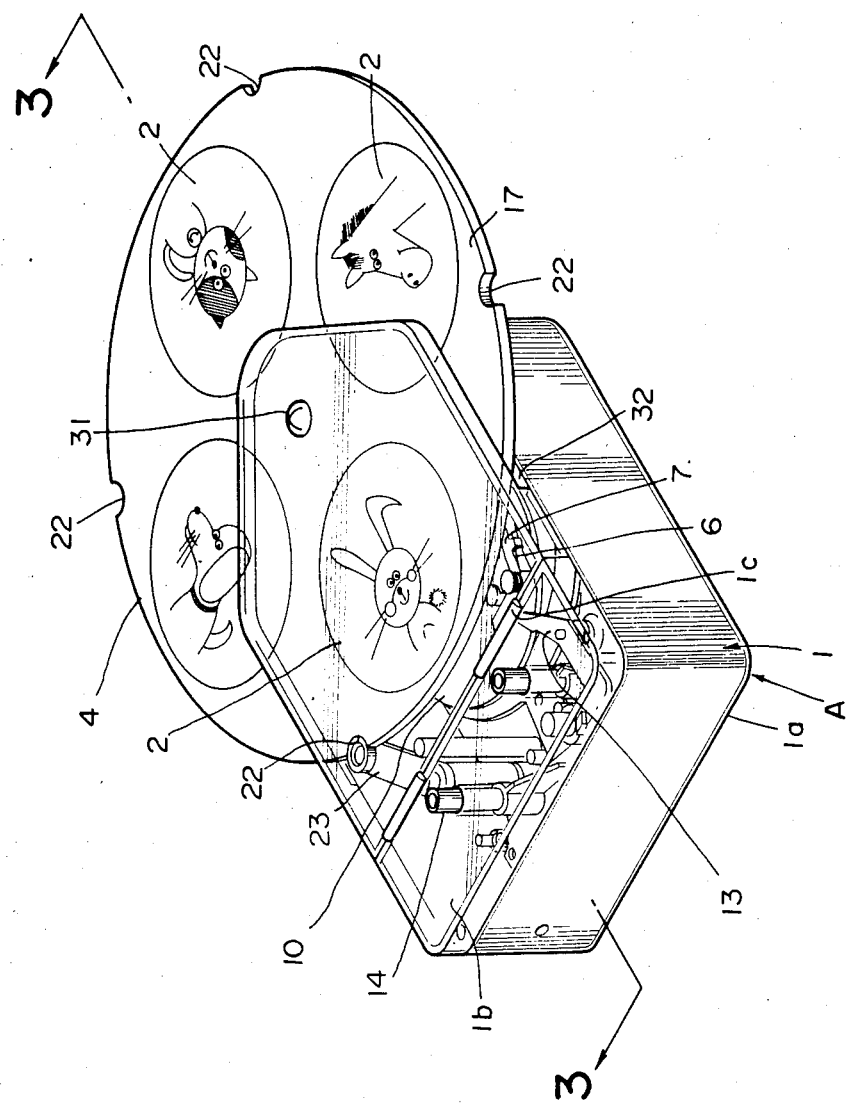
FIG. 1 is a perspective view of a preferred embodiment of the simplified sound reproducing device of this invention.

As can be seen from FIG. 1, a casing 1 consists of a housing 1a and a cover 1b covering the housing 1a. The cover 1b, in this embodiment, is fabricated of transparent plastic material and is formed to be opened or closed by a hinge 1c.

Figure 2:
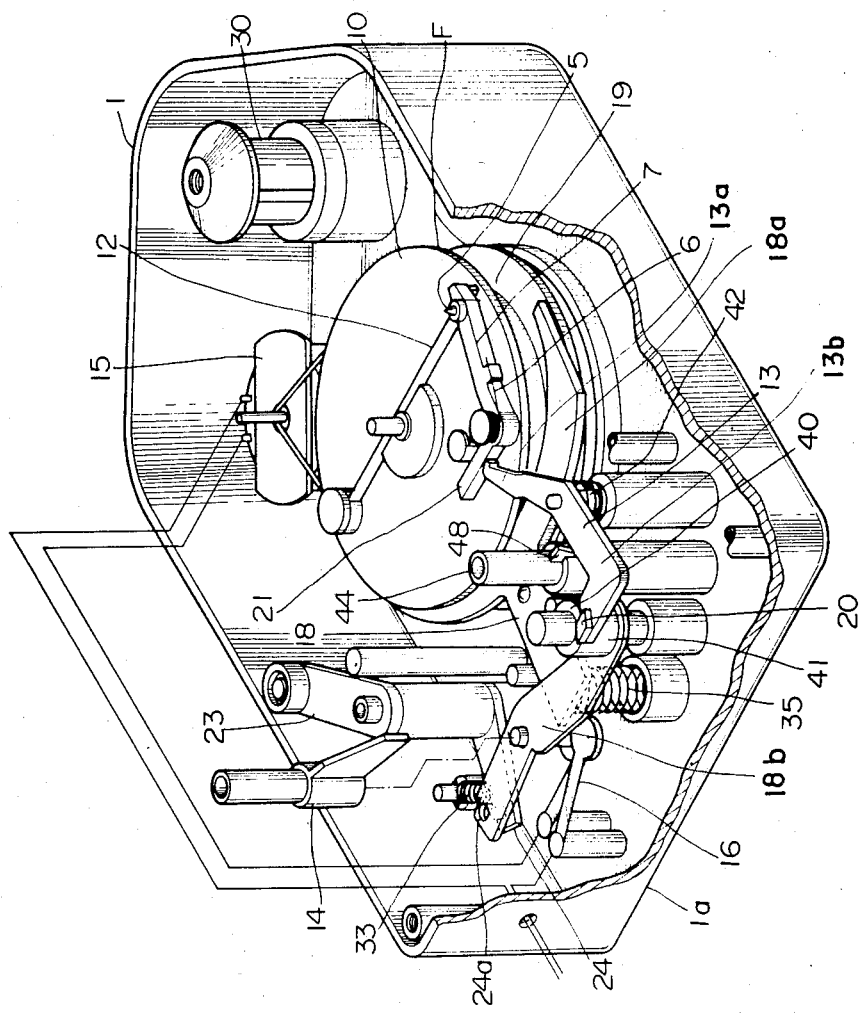
FIG. 2 is a perspective view of the device with its cover taken away.

A boss 30 for pivotal mounting is disposed facing upward as can be seen from FIG. 2, and an indexing shaft 31 is disposed upright at the position corresponding to the boss 31.

The cover 1b has a guide recess 32 formed thereon.

An indexing table 17 is disposed and rotatably mounted on the indexing shaft 31 while being guided by the guide recess 32 with the cover 1b in the open position as shown in FIG. 1. The indexing shaft 31 is inserted into the boss 30 as shown in FIG. 2.

The indexing table 17 carries thereon four record discs 4 with recorded face 3 being directed toward the interior of the housing 1a (refer to FIG. 3). The reversed face of the record discs is faced toward the upper face of the casing as shown by FIG. 1, on which several patterns 2 corresponding to the recorded items are displayed and are visible through the transparent cover 1b. Notches 22 corresponding in number to the number of the record discs carried on the indexing table are formed around the periphery of the indexing table.

As is clearly shown in FIGS. 1 and 2, a crank-shaped engaging member 23 is disposed inside the housing 1a and is capable of rotating in a horizontal direction.

One end of this engaging member 23 is normally biased toward the outer peripheral face of the indexing table 17 by a spring 33, as shown in FIG. 2.

As shown in FIGS. 2 and 3, a bar 18 is disposed in a pivotal manner within the housing 1a of the casing 1. A fulcrum 34 is shown in FIG. 3.

The bar 18 is formed to include a curved and bifurcated head portion 10a and an essentially T-shaped straight trunk and a branched transverse leg portion 18b. Since aforesaid straight trunk and leg portion 18b of the bar 18 is normally urged upward at its lower side by a biasing means such as a coil spring 35, the bifurcated head portion 18a is naturally urged downward.

Disposed at the central part of the housing 1a is a turn table 10 rotatably received in the housing. This turn table 10 is rotatably journalled by a center pin 36, as is clearly shown in FIG. 3, and is supported at its lower part by a stylus force spring 8 so as to be movable, to some extent, in an axial direction.

It is to be noted that the resilient force of this stylus force spring 8 is somewhat weaker than that of the resilient force imparted to the bar 18.

The turn table 10 includes a downwardly facing speaker diaphragm 11 disposed in its interior. An acoustic cylinder 37 formed on the top thereof projects slightly above the top face of the turn table 10. As can be clearly seen in FIGS. 2 and 3, the outer periphery of the turn table 10 is formed so to have a pair of circular flanges F at its front and rear axial ends to define an annular pulley groove 19 therebetween.

Spanning transversely above and almost in the diametrical direction of the turn table 10, a rod-shaped sound transmitting member 12 is disposed with one end floating in the air and is supported at its halfway portion by contact with the upper end of the acoustic cylinder 37.

Above the turn table 10, a tone arm 7 having an upwardly projecting sound reproduction stylus 5 at its forward end is rotatably supported at its rear end. The forward end thereof carrying the reproduction stylus 5 is swingably movable between the outer periphery and the central part of the turn table 10.

The forward end of the tone arm 7 is supported at the portion under the reproduction stylus 5 by slidably contacting the sound transmitting member 12.

A return spring 6 is wound around the swivel point of the tone arm 7, thereby normally urging the forward end having the reproduction stylus 5 toward the outer margin of the turn table 10, the starting point of the record disc 4.

At a portion of the tone arm 7 opposite to the forward portion having the reproduction stylus 5, there is disposed a means 21 to cancel a selected item. This cancelling means 21 is disposed in such a manner that it protrudes radially outward by passing over the outer margin of the turn table 10, at the same time the forward portion having the reproduction stylus 5 arrives at the central part of the turn table 10 and the end point of sound reproduction (refer to FIG. 4). In FIGS. 2 and 3, 15 denotes an electric motor coupled to the turn table 10 by extending a belt between the motor and around the pulley groove 19.

The bifurcated and curved one end 18a of the bar 18 is disposed to extend into the pulley groove 19 defined between the flanges, so that axial movement of the portion 18a slightly downward toward the direction of retraction of the turn table 10 urges the flange at the retraction side downward and thereby cause the turn table 10 to retract against the force of the stylus force spring 8.

The crank-shaped engaging member 23 extends below the lower part of one end of the T-shaped portion 18b of the bar 18, where a male/female coupling means 24 including an upwardly facing projection is constituted. The part of the bar 18 corresponding to the projection is provided with a female coupling means comprising a small hole 24a. The male coupling means 24 on the engaging member 23 is disposed just below the small hole 24a, whenever the engaging member 23 engages one of the notches 22 formed on the indexing table 17.

Figure 5:
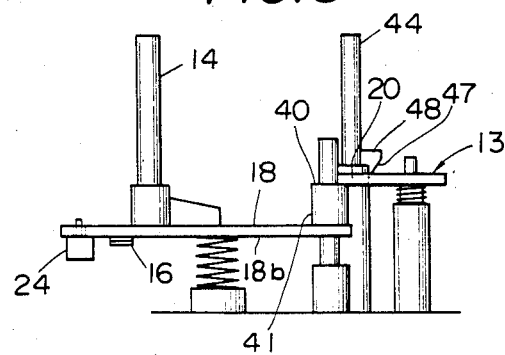
FIGS. 5 and 6 are side views, showing the relationship between the male/female coupling members, reproduction terminating member, engaging member, upright post, manual reproduction terminating rod and so on in an operating and non-operating state, respectively.
Figure 6:
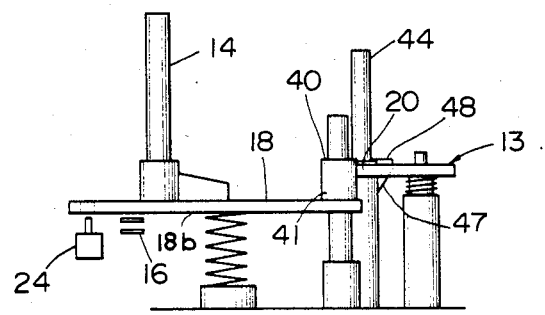
Figure 7:
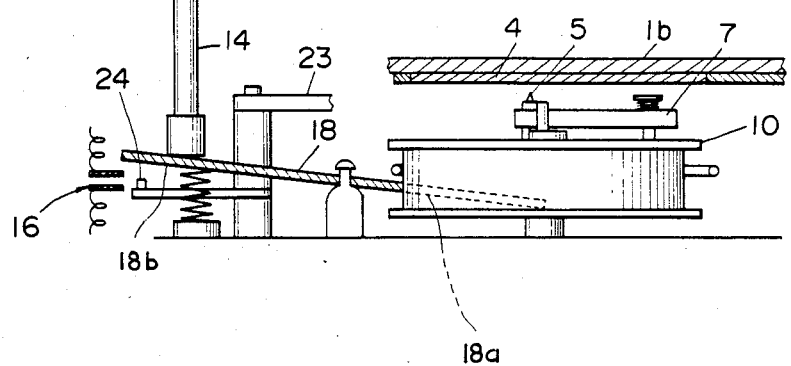
FIG. 7 is a front view showing the relative locations of the turn table, the bar, the electrical contact and the reproduction stylus while in the non-operating state.

An electric contact 16 constituting an electrical circuit to the motor 15 is attached onto the reverse face of the bar 18, as particularly shown in FIGS. 5 through 7. The electric contact 16 enables the circuit to be energized when the trunk and leg portion 18b of the bar 18 is lowered. The circuit is de-energized by opening contact 16, when the leg portion 18b is raised upward.

Each of these drawings shows a starting means 14 formed as a pushing rod which can be depressed from outside the casing. Starting means 14 contacts the upper face of the trunk and leg portion of the bar when depressed.

The other end of the T-shaped portion 14b of the bar 18 is provided with an upright post 41 having a stepped side face 40. A reproduction terminating means 13 is disposed within the housing 1a and alongside the upright post 41.

This reproduction terminating means 13 is rotatably supported at the halfway point of a horizontally extending bent lever portion 13b so as to swing in a horizontal plane.

A torsion spring 42 of somewhat weak force is set at the supporting point of terminating means 13, thereby biasing the lever portion 13b to rotate in a clockwise direction.

One end of the lever 13a of the reproduction terminating means 13 extends slightly above the turn table 10 by passing over the peripheral margin thereof, while the other end of the lever 18b contacts the side face of the upright post 41 under resilient force imparted by the torsion spring 42.

In this way, the other end of the lever 13b together with the stepped side face of the upright post 41, constitutes an engaging means 20. In other words, the other end of the lever 13b forming a trunk and a leg portion will engage the stepped face 40 when the trunk and leg portion 18b of the bar 18 is lowered. This causes the engagement of means 20 and retention of bar 18, against the resilient force imparted by the biasing means 35, at end 18a thereof in its lowered position and at end 18b thereof in its raised position.

An optional manual terminating rod 44 may be provided. This rod is formed, as is clearly seen from FIGS. 1, 2, 3, 4 and 5, as a pushing rod which can be manually depressed from outside the casing 1 and is attached with a projection 48 having a downwardly facing slant face 47. This slant face 47 can engage the inside edge of the bent lever 13a of the reproduction terminating means 13 and urge the lever 13a to turn in a counterclockwise direction. This results in disengagement of the engaging means 20 partway through sound reproduction, thereby lowering bifurcated one end 18a of the bar 18, and causing the retraction of the turn table 10.

FIG. 7 shows the state of the device with the turn table 10 in its retracted position, actuated either by the cancelling means 21 or by depressing the manual pushing rod 44.

The operation of the device of this embodiment is carried out in the following manner.

First, the indexing table 17 carrying a desired item or items is rotatably placed around the indexing shaft 32 of the casing 1. Next, the indexing table 17 is turned in such a manner that the desired item on record disc 4 is placed beneath the transparent cover 1b, and thus indexed. This causes the engaging member 23, resiliently contacted around the indexing table 17, to fall into one of the notches 22 and thereby tentatively fix the indexed position. Next, pushing of the starting means 14 will cause bifurcated head portion 18a of the bar 18 to be raised and trunk and leg portion 18b to be lowered. By this movement, the turn table 10, which has been retained at its retracted position by the resilient force of the stylus force spring 8, is released from the retaining force applied thereto and begins to advance.

At the same time, the electrical contact 16, attached on the reverse face of the trunk and leg portion 18b of the bar 18 and kept OFF prior to depression of the bar 18 by the starting means 14, is turned ON. The motor starts rotation and makes the turn table rotate.

At the same time, the reproduction terminating means 13 contacts the stepped side face 40 and retains the bar 18 at its lowered position. The male coupling member 24 is inserted into the small hole 24a of the bar 18 formed as a female coupling member, thereby coupling engaging member 23 to the notch 22 and giving rise to a completely fixed indexing position.

As the turn table 10 proceeds on, the reproduction stylus 5, normally urged by the return spring 6 toward the starting point of sound reproduction, will engage the recorded face 3 of the record disc 4 at the starting point. It then traces the record groove following the rotation of the turn table 10 until it reaches the end point of sound reproduction. During the period when the reproduction stylus 5 is tracing the recorded face 3 of the record disc 4, the stepped side face 40 formed on the upright post 41 of the bar 18 will be restrained, as shown in FIG. 5, by the engaging member 20 against the biasing force imparted by the biasing means 35. When the reproduction stylus 5 arrives at the end point of sound reproduction, the cancelling means 21 will project radially outward beyond the peripheral margin of the turn table 10. As the turn table 10 rotates further, the means 21 will impinge on the end part of the lever 13b of the terminating means 13, thereby causing the lever 13b to rotate in counterclockwise direction and releasing the engaging member 20 from engagement with the stepped face 40 of the upright post 41.

The moment the engaging member is released, the bar 18 loses its support and begins to urge the turn table 10 back toward its retracted position, thereby detaching the reproduction stylus 5 from the recorded face 3 of the record disc 4.

Thus, the sound reproduction cycle of the device is terminated in this way. However, in order to interrupt the reproduction, pushing down on the manual terminating rod will effect stoppage of the device in the same manner as the cancelling means.

When the reproduction stylus moves away from the recorded face 3 of the record disc 4, the electrical contact 16 will open as shown in FIG. 7 and stop the motor 15 and the turn table 10.

As shown in FIGS. 6 and 7, the male coupling member 24 moves out of the small female hole 24a of the bar 18 and leaves the swing motion of the engaging member entirely free, thus allowing free rotation of the indexing table 17.

According to the present invention, the indexing table can carry a plurality of record discs, the rotation of which enables indexing and reproduction of any desired item on the record disc. It is very convenient for selecting a plurality of record discs and is interesting in its way of indexing and reproducing the same, particularly when this invention is incorporated into an educational toy.

I claim:

1. A simplified sound reproducing device capable of reproducing a plurality of record discs comprising:
   a casing;
   an indexing table carrying a plurality of record discs which can be received by said casing, a recorded face of each disc being faced toward an interior of the casing;
   a tone arm carrying a sound reproduction stylus directed toward the recorded face of one of the plurality of record discs, said tone arm being swingably movable between the starting point and the end point of sound reproduction of the one record disc and urged by a return spring toward the starting point of sound reproduction;

a rotatable turn table disposed within the casing and urged by a stylus force spring in an axial direction, said turn table being formed with a pulley groove defined between a pair of flanges disposed at the axially forward end and rear end of the turn table, respectively;

a speaker diaphragm disposed within said turn table;

a sound transmitting member connected to said speaker diaphragm and to said tone arm for transmitting sound reproduction vibrations of said tone arm to said speaker diaphragm;

a reproduction terminating means to retract said turn table against the biasing force of the stylus force spring, said reproduction terminating means being a bar disposed within said casing and swingably supported at a halfway point thereof, one end of said bar extending up to and around the outer face of said pulley groove so that said bar can urge said turn table to retract against the resilient force exerted by said stylus force spring; and a starting means for advancing said turn table by said stylus force spring, said starting means being disposed to be correlated with another end of said bar so that depression of the starting means causes the bar to move against the biasing force and allow the turn table to advance by means of said stylus force spring, the starting means comprising an engaging means which holds said bar against said biasing means to maintain said turn table at its position advanced where said starting means is depressed, said engaging means further comprising a cancelling means, one end of which is opposite to another end carrying said sound reproduction stylus of said tone arm and is urged to project outwards from the circumferential periphery of said indexing table so that said engaging means can be placed out of engagement by the collision of said cancelling means with said reproduction terminating means;

an electric motor for driving said turn table, said turn table being rotatably connected to said motor by a belt drive system; and at least one electrical contact for supplying electrical power to the turn table when activated by said starting means and for cutting off electrical power when actuated by said reproduction terminating means;

wherein the indexing table, when received by the casing, can fix a selected record disc at a position in which said selected record disc is confronted with said turn table.

2. The device of claim 1, wherein said indexing table is formed to have a plurality of notches on the outer periphery thereof corresponding in number to the number of said plurality of record discs, said engaging member being normally urged toward said outer circumferential periphery of said indexing table, the notches of which can engage the engaging means to fixedly lock said indexing table for performing selected sound reproduction.

3. The device of claim 2, wherein:
said engaging member extends up to and beneath said bar;
said bar and said coupling member constitute in combination a male and female coupling;
said engaging member engages one of said notches; and
said engagement of said engaging member with said notch can occur only when said bar is actuated by said starting means.

4. The device of claim 3, wherein said engaging member is disposed to form an interior angle of less than 90° with respect to the circumferential periphery of said indexing table.

5. The device of claim 3, wherein said casing further comprises a hinged lid portion for swingably opening and closing with respect to said casing, whereby said indexing table can be placed in its operating position by opening said hinged lid portion.

6. The device of claim 4, wherein said casing further comprises a hinged lid portion for swingably opening and closing with respect to said casing, whereby said indexing table can be placed in its operating position by opening said hinged lid portion.

* * * * *